Feb. 13, 1962     J. G. MORGAN     3,021,229

LEADER FILM

Filed May 26, 1960

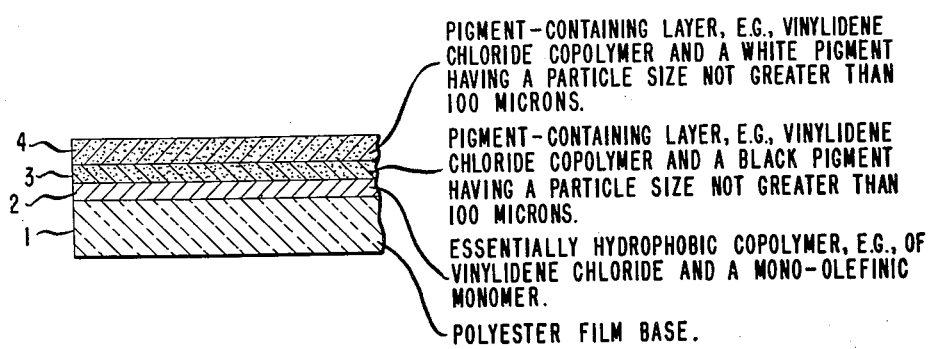

PIGMENT-CONTAINING LAYER, E.G., VINYLIDENE CHLORIDE COPOLYMER AND A WHITE PIGMENT HAVING A PARTICLE SIZE NOT GREATER THAN 100 MICRONS.

PIGMENT-CONTAINING LAYER, E.G., VINYLIDENE CHLORIDE COPOLYMER AND A BLACK PIGMENT HAVING A PARTICLE SIZE NOT GREATER THAN 100 MICRONS.

ESSENTIALLY HYDROPHOBIC COPOLYMER, E.G., OF VINYLIDENE CHLORIDE AND A MONO-OLEFINIC MONOMER.

POLYESTER FILM BASE.

INVENTOR
JAMES GAIL MORGAN

BY *Weston B. Wardell Jr.*

ATTORNEY

3,021,229
LEADER FILM

James Gail Morgan, Cranbury, N.J., assignor to E. I. du Pont de Nemours and Company, Wilmington, Del., a corporation of Delaware
Filed May 26, 1960, Ser. No. 31,799
7 Claims. (Cl. 117—76)

This invention relates to photography and more particularly, it relates to films for use in the photographic art. Still more particularly, it relates to radiation insensitive auxiliary films for use as leader strips to be attached to long strips of photographic films such as motion picture film, films for making microphotographs and the like. Further, the invention relates to improved leader strips which are relatively thin and have high dimensional stability and easily identifiable surfaces.

The use of leader film in the photographic art has long been known. It is commonly used in threading complicated continuous processing machines used for developing, fixing, washing and drying long lengths of motion picture film. In this instance, it is known that considerable time is involved in threading film through such machines. Therefore, the practice has been to leave leader film threaded in the machines when they are not being used for processing exposed films. The leader films are thus subjected to a variety of conditions which tend to affect the dimensional stability of the film. A strip of leader material may for example, be immersed in an alkaline developer bath, an acid bath, water wash bath and a drying cabinet throughout its length. It is well-known that cellulosic films which have been in general use in the motion picture field for years have very poor dimensional stability and this characteristic is enhanced when the leader material is immersed for long periods of time in the above liquids. In some instances where cellulose acetate is used as leader material, it expands upon immersion in the processing liquids to such an extent that it becomes slack enough to unthread itself from the guide rollers in the processing machines. It then requires long troublesome work to rethread the machines and establish the required tension in the film. It is also known that leader films constructed from cellulosic materials have a relatively short useful life because of low resistance to wear due to abrasion and other factors. The prior art also teaches that leader films may be coated with a pigment layer on one side and embossed to give a mottle-type surface on the other side for identification purposes. The pigment is usually white for the head leader and black for the tail leader for a given unit of motion picture film. This poses a difficulty, however, of determining the emulsion side of the film and correctly splicing the leader film since a white leader will appear the same from both sides in subdued light. This is also very troublesome in case of a roll-over of the film in the processing machine. The pigmented gelatin layers used in the prior art add to the problems because of their sensitivity to environmental conditions. It is also difficult to splice them because of the pigment layers. Cellulosic structures must of necessity be at least 6 mils in thickness to minimize stretching and weakening in processing solutions. This, coupled with the heavy pigmented gelatin layers, makes for a relatively rigid film which is highly susceptible to brittleness. Consequently, such films are weak and prone to breakage after only moderate use.

An object of this invention is to provide leader films possessing good dimensional stability, particularly when subjected to various photographic processing solutions and conditions. Another object is to provide such films, the opposite sides of which are readily identifiable in subdued light. A further object is to provide such films which are capable of being easily and securely spliced. A still further object is to provide such films which are thin enough to remain highly flexible but at the same time retain their dimensional stability. Still other objects will appear hereinafter.

These and other objects are accomplished by the present invention which embodies a novel leader film comprising a base film of highly flexible, biaxially-oriented, macromolecular polyester film corresponding to the polyesterification product of a dicarboxylic acid and a dihydric alcohol having on one surface thereof, in order, (1) a thin layer of an adherent, film-forming, essentially hydrophobic copolymer of 35 to 96% vinylidene chloride and 4 to 65% of at least one other polymerizable mono-olefinic monomer copolymerizable therewith, (2) a layer of from 0.1 to 0.2 mil in thickness of a vinylidene chloride copolymer coated from an aqueous dispersion comprising said copolymer and a black pigment, and (3) a layer of from 0.2 to 0.3 mil in thickness of a vinylidene chloride copolymer coated from an aqueous dispersion comprising said copolymer and a white pigment; said vinylidene chloride copolymer of layers (2) and (3) being selected from the group consisting of (a) a copolymer obtained from 35 to 96% vinylidene chloride and 4 to 65% acrylonitrile, and (b) a terpolymer obtained from 35 to 96% vinylidene chloride, 3.5 to 64.5% methyl acrylate and 0.5 to 25% itaconic acid. Suitable monomers copolymerizable with the vinylidene chloride of layer (1) are disclosed in Alles et al., U.S. Patent 2,627,088; the layer may be formed in the manner described in Alles, U.S. Patent 2,779,684.

The invention will be understood more readily and distinguished from the prior art by reference to the accompanying drawing of an enlarged, schematic cross-sectional view of the leader film.

Referring now to the drawing, a polyester film base 1 bears on one surface, in order, a thin layer 2 of an essentially hydrophobic copolymer of vinylidene chloride and at least one mono-olefinic monomer, a pigment-containing layer 3 of a vinylidene chloride copolymer and a black pigment, and a second pigment-containing layer 4 of a vinylidene chloride copolymer and a white pigment.

Suitable vinylidene chloride copolymers include copolymers of 35 to 96% vinylidene chloride with 4 to 65% acrylonitrile and 35 to 96% vinylidene chloride, 3.5 to 64.5% methyl acrylate and 0.5 to 25% itaconic acid. For the black pigmented layer, carbon black is the preferred pigment and may be utilized in the range of 0.15 to 0.30 part per part of copolymer binder with the preferred ratio being about 0.22 per part of binder. It should have a particle size not greater than 100 microns and the density of the layer should be at least 2.0 as determined through a yellow filter on a Model R1100C densitometer manufactured by the Western Electric Company. For the contiguous white pigmented layer titanium dioxide is preferred, although other white pigments may be used. In the case of titanium dioxide the ratio of pigment to binder may vary from 0.50 to 1 to 0.70 to 1 with the preferred ratio being about 0.56 to 1. It should have a particle size not greater than 100 microns and the density of the layer should be at least 1.0 as determined through the yellow filter in the densitometer described above.

The aqueous dispersions described above may also contain other adjuvants. For example, in the case of the vinylidene chloride/methyl acrylate/itaconic acid copolymer there may be added from 0.25 to 1 part of polyvinyl alcohol per part of copolymer. Gelatin may be used in place of polyvinyl alcohol as an adjuvant in a ratio of 0.1 to 0.25 part per part of copolymer. A small amount (e.g., not more than 3% of the total aqueous dispersion), of hydroxyethylcellulose may be added as a thickening agent. Surface active agents such as saponin may also be added to facilitate coating.

One very important treatment is necessary to obtain a smooth dispersion and minimize agglomeration and also to produce maximum covering power. This involves milling the aqueous dispersions by means of a colloid mill, a ball mill or a sand mill. The use of a sand mill as described in Hochberg, U.S. Patent 2,581,414 is the preferred method of milling. Generally, the pigment and water mixture are stirred together for about one minute and then milled for 2–3 minutes. The copolymer, hydroxyethylcellulose and wetting agent are added after the milling.

The invention will now be illustrated in and by the following examples:

Example I

A polyethylene terephthalate film coated with a layer of a vinylidene chloride/methyl acrylate/itaconic acid copolymer (90:10:2 by weight) made according to Example IV of Alles, U.S. Patent 2,779,684, was coated with an aqueous dispersion having the following composition:

| | Weight percent |
|---|---|
| Vinylidene chloride (80%)/acrylonitrile (20%) copolymer (51–53% aqueous dispersion) | 39.2 |
| Carbon black (Aquablak-Columbian carbon; 45% aqueous dispersion) | 10.4 |
| Hydroxyethylcellulose (5% aqueous solution) | 0.7 |
| Water (distilled) | 45.8 |
| Saponin (10% aqueous solution) | 3.9 |

The carbon black was mixed with the water, the mixture was stirred for one minute and then sand milled for three minutes. The dispersion was removed from the sand mill by filtration. The particle size of the pigment must be below 100 microns. The remainder of the above ingredients were then stirred in and the composition was coated at 70 ft./min. using an air knife doctor and dried in a conventional manner at 190° F. The dried layer had a thickness of about 0.1 mil. Over the resulting black layer there was coated an aqueous dispersion having the following composition:

| | Weight percent |
|---|---|
| Vinylidene chloride (80%)/acrylonitrile (20%) copolymer (51-53% aqueous dispersion) | 40.8 |
| Rutile titanium dioxide (Du Pont Ti-Pure R–510; 25% aqueous dispersion) | 12.6 |
| Hydroxyethylcellulose (5% aqueous solution) | 2.5 |
| Water (distilled) | 40.8 |
| Saponin (10% aqueous solution) | 3.3 |

The copolymer was made in the manner described in Alles et al., U.S. Patent 2,491,023. The titanium dioxide was mixed with the water for about one minute and sand milled for about three minutes. The particle size of the pigment must be below 100 microns. The dispersion was removed from the sand mill by filtration. The rest of the ingredients were than added with stirring and the resulting composition was coated over the carbon black layer at 70 ft./min. using an air knife doctor and dried in a conventional manner at 190° F. to give a layer thickness of about 0.3 mil.

The resulting film, which had a total thickness of 4.4 mils, showed good resistance to high pH developing and low pH fixing compositions even upon prolonged immersion. The films showed excellent dimensional stability with no indication of stretching sufficient to cause unthreading of cine processing machines. The film had good contrast between the black and white layers and was easily spliced to either similar polyester cine film or to cellulosic type film in the manner taught by assignee's application of Albert, U.S. Serial No. 729,224, filed April 18, 1958.

Example II

A polyethylene terephthalate film coated with a layer of a vinylidene chloride/methyl acrylate/itaconic acid copolymer (90:10:2 by weight) made according to Example IV of Alles, U.S. Patent 2,779,684, was coated with an aqueous dispersion having the following composition:

| | Weight percent |
|---|---|
| Vinylidene chloride/methyl acrylate/itaconic acid copolymer (45–48% aqueous dispersion) | 34.0 |
| Polyvinyl alcohol (Elvanol 72–51, Du Pont) | 4.5 |
| Carbon black (Aquablak-Columbian carbon; 45% aqueous dispersion) | 10.0 |
| Hydroxyethylcellulose (5% aqueous solution) | 0.5 |
| Water (distilled) | 47.0 |
| Saponin (10% aqueous solution) | 4.0 |

The copolymer was made in the manner described in Alles, U.S. Patent 2,627,088, and contained 83.4% vinylidene chloride, 14.7% methyl acrylate and 1.9% itaconic acid. The carbon black was mixed with the water and sand milled for one minute or until the particle size was below 100 microns. The dispersion was then removed from the mill by filtration. The remainder of the ingredients were then added with stirring and the resulting composition was coated at 70 ft./min. using an air knife doctor and dried in a conventional manner at 190° F. The layer had a thickness of about 0.1 mil and a density of 2.0 as measured by the densitometer described above.

Over the resulting black layer there was coated an aqueous dispersion similar to the above dispersion except that it contained 33% rutile titanium dioxide (based on total binder) which also was sand milled until the particle size was below 100 microns in place of the carbon black to give a white layer having a thickness of about 0.3 mil and a density of 1.0 as measured by the densitometer described above. The resulting film had a total thickness of about 4.4 mils and had characteristics very similar to that of Example I.

Example III

Example II was repeated except that 33% of gelatin (based on the copolymer) was used in place of the polyvinyl alcohol in both the carbon black dispersion and the titanium dioxide dispersion. The resulting layers showed good resistance to photographic processing solutions even on prolonged immersion. The leader had a total thickness of about 4.4 mils and had good dimensional stability under processing conditions. It also showed no tendency to become unthreaded in the processing machines as is the case with cellulosic type films.

Example IV

A polyethylene terephthalate film coated with a layer of vinylidene chloride/methyl acrylate/itaconic acid copolymer (90:10:2 by weight) made according to Example IV of Alles, U.S. Patent 2,779,684, was coated with an aqueous dispersion of the vinylidene chloride/acrylonitrile copolymer-carbon black dispersion described in Example I above and dried in a conventional manner. The dried layer had a thickness of about 0.1 mil. Over the resulting black layer there was coated an aqueous dispersion of the vinylidene chloride/methyl acrylate/itaconic acid copolymer-titanium dioxide dispersion described in Example II. The resulting layer had a dried thickness of about 0.3 mil and a density of 1.0. The resulting film had a total thickness of about 4.4 mils and had characteristics similar to that of Example I.

Example V

A polyethylene terephthalate film coated with a layer of vinylidene chloride/methyl acrylate/itaconic acid copolymer (90:10:2 by weight) made according to Example IV of Alles, U.S. Patent 2,779,684, was coated with an aqueous dispersion of the vinylidene chloride/methyl acrylate/itaconic acid copolymer-carbon black dispersion described in Example II. The coating was dried in a conventional manner and had a dried thickness of about 0.1 mil and a density of about 2.0. Over the resulting black layer there was coated an aqueous dispersion of the vinylidene chloride/acrylonitrile copolymer-titanium dioxide dispersion described in Example I. The layer was dried in a conventional manner to give a layer thickness of about 0.3 mil. The resulting film had a total thickness of 4.4 mils and had characteristics similar to that of Example I.

In place of the polyethylene terephthalate film supports described above, other suitable polyester films may be used. For example, the polyethylene terephthalate/isophthalate films of British Patent No. 766,290 and Canadian Patent No. 562,672 will be found suitable. The films formed from polyesters formed by condensing terephthalic acid and dimethyl terephthalate with propylene glycol, diethylene glycol, tetramethylene glycol or cyclohexane 1,4-dimethanol (hexahydro-p-xylene alcohol) will also be found to be suitable as the support for the novel leader films of the invention. The above polyester films are particularly suitable because of low percentage of dimensional change under a variety of environmental conditions.

In place of the vinylidene chloride/acrylonitrile copolymer and the vinylidene chloride/methyl acrylate/itaconic acid copolymer described above, other vinylidene chloride copolymers may be used. For example, from 35 to 96% of vinylidene chloride may be copolymerized with other acrylic esters including alkyl esters of acrylic and methacrylic acids having from 1 to 18 carbon atoms in the alkyl group (e.g., methyl methacrylate, ethyl methacrylate, butyl methacrylate, octyl methacrylate, n-dodecyl methacrylate, n-octadecyl methacrylate, ethyl acrylate, and propyl acrylate, vinyl chloride and methacrylonitrile. Suitable methods for making the copolymers are described in U.S. Patents 2,160,903, 2,160,931 to 2,160,943 inclusive, 2,160,945, 2,160,946 and 2,170,947.

A distinct advantage in producing leader film using the above materials is that they may be applied from aqueous systems. This is more economical and less hazardous than the prior art leader films which were made by coating cellulosic materials with organic solvent systems.

Although carbon black and titanium dioxide are the preferred pigments, other pigments and dyes may be used. For example, under certain safe-light conditions, other colors for the two layers may be more desirable in order to provide sufficient contrast between the two layers.

The objects of this invention, as previously stated, are realized by this novel leader film which can be used both for the head white leader and the black tail leader if desired. Not only can this film be used in the processing machines described above, but it can also be used wherever leader film is ordinarily used, i.e., cameras, printers and projectors. The film has high dimensional stability and is thin, but extremely durable and it can be readily spliced.

What is claimed is:

1. A leader film comprising a base film of highly flexible, biaxially-oriented, macromolecular polyester film corresponding to the polyesterification product of a dicarboxylic acid and a dihydric alcohol having on one surface thereof, in order, (1) a thin layer of an adherent, film-forming, essentially hydrophobic copolymer of 35 to 96% vinylidene chloride and from 4 to 65% of at least one other polymerizable mono-olefinic monomer copolymerizable therewith; (2) a layer of from 0.1 to 0.2 mil in thickness of a vinylidene chloride copolymer coated from an aqueous dispersion comprising said copolymer and a black pigment, and (3) a layer of from 0.2 to 0.3 mil in thickness of a vinylidene chloride copolymer coated from an aqueous dispersion comprising said copolymer and a white pigment; said vinylidene chloride copolymer of layers (2) and (3) being selected from the group consisting of (a) a copolymer obtained from 35 to 96% vinylidene chloride and 4 to 65% acrylonitrile, and (b) a terpolymer obtained from 35 to 96% vinylidene chloride, 3.5 to 64.5% methyl acrylate and 0.5 to 25% itaconic acid.

2. Film according to claim 1 wherein the copolymer of layer (1) is obtained from 35 to 96% vinylidene chloride, 3.5 to 64.5% of an acrylic ester selected from the group consisting of alkyl acrylates and alkyl methacrylates wherein said alkyl groups contain from 1 to 8 carbon atoms, and 0.5 to 25% itaconic acid.

3. A leader film comprising a base film of highly flexible, biaxially-oriented, macromolecular polyethylene terephthalate film having on one surface thereof, in order, (1) a thin layer of from 0.5 to 4 mg./dm.$^2$ of an adherent, film-forming, essentially hydrophobic copolymer of about 88% vinylidene chloride, about 10% methyl acrylate and about 2% itaconic acid; (2) a layer of from 0.1 to 0.2 mil in thickness of a vinylidene chloride copolymer coated from an aqueous dispersion comprising a copolymer obtained from 35 to 96% vinylidene chloride and 4 to 65% acrylonitrile, and carbon black of a particle size not greater than 100 microns, said carbon black being present in a ratio of from about 0.15 to 0.30 per part of copolymer, and (3) a layer of from 0.2 to 0.3 mil in thickness of a vinylidene chloride copolymer coated from an aqueous dispersion comprising a copolymer obtained from 35 to 96% vinylidene chloride and 4 to 65% acrylonitrile, and titanium dioxide of a particle size not greater than 100 microns, said titanium dioxide being present in a ratio of from about 0.50 to 0.70 per part of copolymer.

4. A leader film comprising a base film of highly flexible, biaxially-oriented, macromolecular polyethylene terephthalate film having on one surface thereof, in order, (1) a thin layer of from 0.5 to 4 mg./dm.$^2$ of an adherent, film-forming, essentially hydrophobic copolymer of about 88% vinylidene chloride, about 10% methyl acrylate and about 2% itaconic acid; (2) a layer of from 0.1 to 0.2 mil in thickness of a vinylidene chloride copolymer coated from an aqueous dispersion comprising a copolymer obtained from 35 to 96% vinylidene chloride with 3.5 to 64.5% methyl acrylate and 0.5 to 25% itaconic acid, and carbon black of a particle size not greater than 100 microns, said carbon black being present in a ratio of from about 0.15 to 0.30 per part of copolymer, and (3) a layer of from 0.2 to 0.3 mil in thickness of a vinylidene chloride copolymer coated from an aqueous dispersion comprising a copolymer obtained from 35 to 96% vinylidene chloride with 3.5 to 64.5% methyl acrylate and 0.5 to 25% itaconic acid, and titanium dioxide of a particle size not greater than 100 microns, said titanium dioxide being present in a ratio of from about 0.50 to 0.70 per part of copolymer.

5. A leader film comprising a base film of highly flexible, biaxially-oriented, macromolecular polyethylene terephthalate film having on one surface thereof, in order, (1) a thin layer of from 0.5 to 4 mg./dm.$^2$ of an adherent, film-forming, essentially hydrophobic copolymer of about 88% vinylidene chloride, about 10% methyl acrylate and about 2% itaconic acid; (2) a layer of from 0.1 to 0.2 mil in thickness of a vinylidene chloride copolymer coated from an aqueous dispersion comprising a copolymer obtained from 35 to 96% vinylidene chloride and 4 to 65% acrylonitrile, and carbon black of a particle size not greater than 100 microns, said carbon black being present in a ratio of from about 0.15 to 0.30 per part of copolymer, and (3) a layer of from 0.2 to 0.3 mil in thickness of a vinylidene chloride copolymer coated from an aqueous dispersion comprising a copolymer obtained from 35 to 96% vinylidene chloride with 3.5 to 64.5% methyl acrylate and 0.5 to 25% itaconic acid, and titanium dioxide of a particle size not greater than 100 microns, said titanium dioxide being present in a ratio of from about 0.50 to 0.70 per part of copolymer.

6. A leader film comprising a base film of highly flexible, biaxially-oriented, macromolecular polyethylene terephthalate film having on one surface thereof, in order, (1) a thin layer of from 0.5 to 4 mg./dm.$^2$ of an adherent, film-forming, essentially hydrophobic copolymer of about 88% vinylidene chloride, about 10% methyl acrylate and about 2% itaconic acid; (2) a layer of from 0.1 to 0.2 mil in thickness of a vinylidene chloride copolymer coated from an aqueous dispersion comprising a copolymer obtained from 35 to 96% vinylidene chloride with 3.5 to 64.5% methyl acrylate and 0.5 to 25% itaconic acid, and carbon black of a particle size not greater than 100 microns, said carbon black being present in a ratio of from about 0.15 to 0.30 per part of copolymer, and (3) a layer of from 0.2 to 0.3 mil in thickness of a vinylidene chloride copolymer coated from an aqueous dispersion comprising a copolymer obtained from 35 to 96% vinylidene chloride and 4 to 65% acrylonitrile, and titanium dioxide of a particle size not greater than 100 microns, said titanium dioxide being present in a ratio of from about 0.50 to 0.70 per part of copolymer.

7. Leader film according to claim 2 wherein said vinylidene chloride copolymers of layers (2) and (3) are obtained from about 80% vinylidene chloride and about 20% acrylonitrile.

References Cited in the file of this patent

UNITED STATES PATENTS 2,779,684    Alles  ------------------ Jan. 29, 1957

OTHER REFERENCES

"How to Convert Waste Film Into Leader Film," Motion Picture News, vol. 15, page 947, Feb. 10, 1917.